March 7, 1961 W. SCHMID 2,973,695
ELECTRIC CONTROL FOR COPYING MACHINES
Filed July 28, 1958 9 Sheets-Sheet 1

March 7, 1961 W. SCHMID 2,973,695
ELECTRIC CONTROL FOR COPYING MACHINES
Filed July 28, 1958 9 Sheets-Sheet 2

Inventor:
Wolfgang Schmid
by:
Michael S. Striker
Attorney

Fig. 7

March 7, 1961 W. SCHMID 2,973,695
ELECTRIC CONTROL FOR COPYING MACHINES
Filed July 28, 1958 9 Sheets-Sheet 5

Inventor
Wolfgang Schmid
by Michael S. Striker
attorney

March 7, 1961 W. SCHMID 2,973,695
ELECTRIC CONTROL FOR COPYING MACHINES
Filed July 28, 1958 9 Sheets-Sheet 7

March 7, 1961 W. SCHMID 2,973,695
ELECTRIC CONTROL FOR COPYING MACHINES
Filed July 28, 1958 9 Sheets-Sheet 8

United States Patent Office 2,973,695
Patented Mar. 7, 1961

2,973,695
ELECTRIC CONTROL FOR COPYING MACHINES
Wolfgang Schmid, Gagny, France, assignor to Societe Automata, Paris, France, a company of France
Filed July 28, 1958, Ser. No. 751,493
Claims priority, application Germany July 23, 1952
9 Claims. (Cl. 90—13.5)

The present invention relates to machine tools.
This application is a continuation-in-part of co-pending application Serial No. 311,059, filed September 23, 1952, and entitled "Electrical Control for Copying Machines," now abandoned.

More particularly, the present invention relates to that type of machine tool according to which the work is machined to a configuration determined by the cooperation between a template and a feeler.

One of the objects of the present invention is to provide a machine tool of the above type which is fully automatic.

Another object of the present invention is to provide a machine tool of the above type which is capable of automatically controlling the machine tool to operate on the work in a number of different directions and in a fully automatic manner depending upon configuration of the template.

A further object of the present invention is to provide an automatic control system according to which the direction of movement of a carriage, for example, of a machine tool is determined by the degree of deflection of a feeler.

An additional object of the present invention is to provide a machine tool of the above type which will be automatically prevented from operating when unusual feeler deflections take place.

It is also an object of the present invention to provide a machine tool of the above type with signals which advise the operator as to when the machine is operating properly.

The object of the present invention also include the provision of a machine tool of the above type which is capable of being set either for fine operation or for coarse operation so that the operations of the machine tool take place in a minimum amount of time inasmuch as coarse operations are carried out more rapidly than fine operations.

With the above objects in view the present invention includes in a machine tool a carriage means capable of carrying out a first pair of opposed movements and a second pair of opposed movements which are different from the first pair of movements. A moving means cooperates with the carriage means for moving the latter along any one of these movements or along a path determined by a combination of one of the first pair of movements with one of the second pair of movements. A plurality of electrical actuating means cooperates singly and in pairs with the moving means for actuating the latter to move the carriage means along one of the above movements when the actuating means are separately energized and along a movement resulting from a combination of one of the first pair of movements with one of the second pair of movements when the actuating means are energized in pairs. A switch means of the present invention cooperates with the plurality of actuating means for energizing the latter, during movement of switch means away from the rest position thereof, in such a way that first one of the several actuating means is energized, then a second one of these actuating means is energized while the first actuating means is maintained energized, then the first actuating means is de-energized while the second actuating means is maintained energized, and then a third actuating means is energized while the second actuating means is maintained energized, and so on. A feeler means cooperates with the switch means for moving the latter away from its rest position when the feeler means is deflected from its own rest position, and the extent of movement of the switch means away from its rest position is proportional to the degree of deflection of the feeler means, so that in this way the direction of movement of the carriage means is determined by the degree of deflection of feeler means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
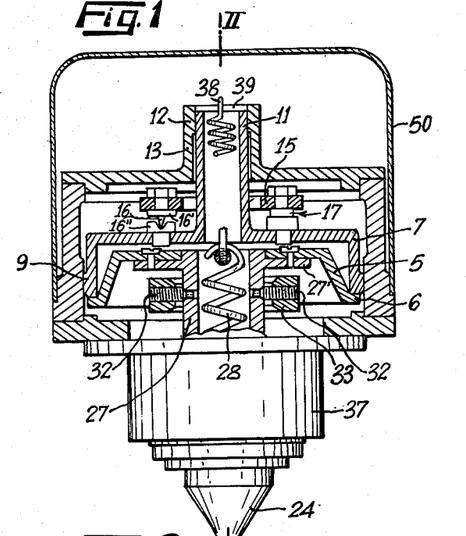
Fig. 1 is a sectional elevational view of a feeler means according to the present invention, the section of Fig. 1 being taken along line I—I of Fig. 2.
Figure 2:
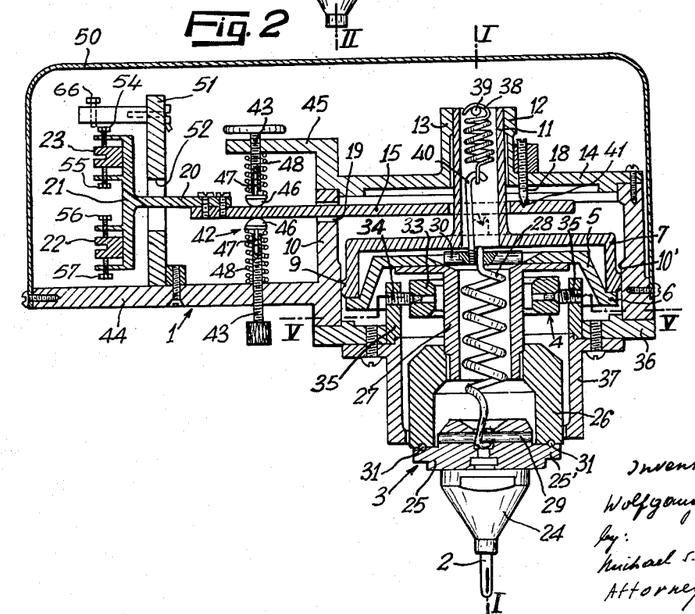
Fig. 2 is a sectional elevational view of the feeler means as well as part of a switch means which cooperates with the feeler means to be actuated by the latter, Fig. 2 being taken along line II—II of Fig. 1.

Referring now to the drawings and more particularly to Figs. 1 and 2 of the same, it will be seen that the tracing device of the present invention comprises support means 1 which is adapted to be mounted on the copying machine in which the tracing device is used in such a way that the contact feeler or tracing pin 2 mounted on the end of the spindle member 3 may be brought in contact with a template mounted on the copying machine. The spindle member 3 is mounted at the upper end thereof in a gimbal arrangement 4 for universal lateral oscillation relative to the support 1. A first transverse member 5 is fixedly connected in any convenient manner to the upper end of the spindle member 3 so as to be movable therewith. The first transverse member 5 extends transverse to the longitudinal axis of the spindle member 3 and has supporting portions 6 spaced radially from and arranged circumferentially around the spindle member 3. Supported on the first transverse member 5 is a second member 7 having bearing portions 9 resting with the bottom face thereof on the top face of the supporting portion 6 of the first transverse member 5. The annular outer face of the bearing portions 9 is guided on the inner cylindrical face 10' of a housing 10 forming part of the support means 1. The upper end of a tubular extension 11 projecting upwardly from a center portion of the second transverse member 7 is guided in a bearing portion 12 formed in a tubular extension 13 projecting upwardly from a cover member 14 resting on the housing 10. The bearing 12 and the inner cylindrical surface 10' of the housing 10 form therefore guide means for guiding the second transverse member 7 in a direction along the axis of the spindle member 3.

Supported between the cover member 14 of the cylindrical housing 10 and the second transverse member 7 is an elongated switch arm 15 for oscillation in a plane including the longitudinal axis of the spindle. The mounting means for the elongated arm 15 comprise a point support 16 and a knife edge support 17, located spaced from each other in a plane passing through the spindle axis, and a point support 18 fastened to cover member 14 and contacting the top surface of the arm 15 at a point spaced from the supports 16 and 17 in longitudinal direction of the elongated arm 15. The arm 15 extends in longitudinal direction through a slot 19 formed in the housing 10 of the support.

Figure 4:
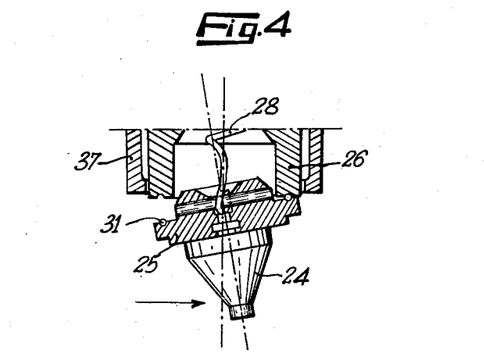
Fig. 4 is a fragmentary sectional elevational view showing the feeler means in a highly deflected condition.

The spindle member 3 of the tracing device is preferably made out of several parts as clearly illustrated in Figs. 1 and 2. The contact feeler 2 is removably mounted in the chuck 24, which in turn is threadedly connected or otherwise fastened to a member 25. Resting on the top face of the annular flange 25' of the member 25 is a bell-shaped member 26 to which in turn a tubular member 27, extending from the member 26 upwardly in axial direction of the spindle, is fixedly connected. The member 25 is held against the member 26 by a tension spring 28, which is fastened on its opposite ends to pins 29 and 30. In this way a resilient joint is formed between the members 24, 25 carrying the contact feeler 2 and the remainder of the spindle. If excessive lateral forces are exerted on the feeler 2, the feeler, the chuck 24 and the member 25 may tilt to the remainder of the spindle, that is relative to the members 26 and 27, in the manner as illustrated in Fig. 4. Bending or other damage to the spindle is prevented in this way.

For certain applications it is desirable to use instead of a straight contact feeler 2 as shown in Fig. 2 a contact feeler in which the contact end extends laterally from the spindle axis. To avoid excessive torsional stresses in the spindle member 3 during the use of such a contact feeler, the top face of the flange 25' of the member 25 is provided with a plurality of spacedly arranged semi-spherical cavities and corresponding semi-spherical cavities are arranged opposite the cavities in the member 25 on the bottom face of the member 26. Small balls 31 are located in these opposite cavities, which prevent under normal operating conditions turning movement between the members 25 and 26. However, if excessive torsional forces are exerted on the contact feeler 2, the member 25 may turn relative to the member 26, since in this case the balls 31 will act like cams separating the members 25 and 26 against the action of the spring 28. The balls 31 act therefore as stop means for holding the contact feeler 2 and the spindle member 3 against rotation relative to each other about their longitudinal axes under normal operating conditions, while allowing turning of the contact feeler 2 and the members 24 and 25 fixedly attached thereto relative to the other members of the spindle if excessive torsional forces are applied against the feeler 2.

Figure 5:
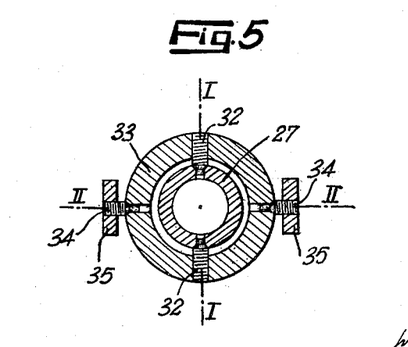
Fig. 5 is a sectional plan view taken along line V—V of Fig. 2 and showing the universal bearing support for the feeler.

As mentioned before the spindle member 3 is mounted for universal lateral oscillation relative to the support 1. For this purpose the tubular member 27 of the spindle is mounted for oscillation about the axis of two opposite pivot pins 32 which in turn are fastened to the gimbal ring 33 (Fig. 5). The gimbal ring 33 itself is mounted for oscillation about an axis, normal to the axis of the two pivot pins 32, on pivot pins 34. Pins 34 are carried by and projecting inwardly from brackets 35, which extend upwardly from a cover member 36 closing the bottom of the cylindrical housing 10. Extending downwardly from the cover member 36 and fastened thereto by screws or in any other convenient manner is a cylindrical member 37 which surrounds the member 26 of the spindle. Necessary clearance is provided between the outer surface of the member 26 and the inner surface of the member 37 to permit oscillation of the spindle within the member 37.

Fixedly mounted on a lateral extending flange 27' of the member 27, properly centered thereon and connected thereto by screws as best shown in Fig. 1 is the first transverse member 5. The member 5 is dish-shaped and has a rim portion or supporting portion 6 spaced radially and arranged circumferentially around the spindle member 3. The upper surface of the supporting portion 6 is preferably substantially in one plane with the axes of the pivot pins 32 and 34 of the gimbal arrangement 4. It should be noted that the outer annular surface of the supporting portion 6 is properly spaced from the inner surface of the housing 10 so that the dish-shaped transverse member 5 may tilt together with the spindle member 3 about the pivot pins 32 and 34 in any lateral direction.

The bottom face of the upper transverse member 7 is pressed against the top face of the supporting portion 6 of the lower transverse member 5 by a spring 38, one end of which is fastened to a pin 39 carried by the tubular extension 11 of the upper transverse member and the other end of which is fastened by a hook 40 to the pin 30 resting on the upper surface of the member 27. It is understood that the spring 28 is stronger than the spring 38 so that the pin 30 will rest on the top surface of the member 27.

Figure 3:
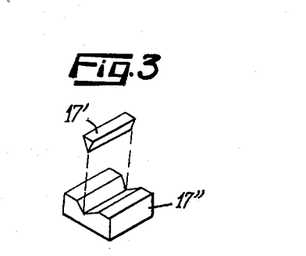
Fig. 3 is an exploded perspective illustration of a knife-edge support forming part of the feeler means.

The point support 16 comprises a hardened needle point 16' fastened to and extending downwardly from the bottom surfaces of arm 15 at a point laterally spaced from the axis of the spindle member 3. The point 16' of the point support rests against V-shaped hardened insert 16" mounted on the top surface of the second transverse member 7. The knife-edge support 17 comprises a knife-edge member 17' fastened to and extending downwardly from the bottom surface of the arm 15 and supported on a V-shaped insert 17" mounted opposite the knife-edge of the member 17' on the top surface of the member 7. The shapes of the members 17' and 17" are most clearly shown in Fig. 3 and the member 17' is preferably adjustable in the direction of the axes of the spindle member. The supports 16 and 17 are preferably mounted in a plane including the axis of the spindle and normal to the longitudinal axis of the motion transmitting member 15. Engaging the top surface of the arm 15 at a point spaced in longitudinal direction of this member toward one end thereof is a needle pivot 18 which is fastened, adjustable in longitudinal direction thereof, to the cover 14. The hardened point of the needle pivot 18 engages into a conical recess 41 formed in the top surface of the arm 15. The arm 15 is thus supported at three points and the plane in which the arm 15 is located in the undeflected position of the spindle 3 may be adjusted by adjusting the supports 17 and 18. The arm 15 extends with the necessary clearance, to allow oscillation of this arm, through the slot 19 formed in the housing 10.

Motion damping means 42 are provided which engage the arm 15. The motion damping means 42 comprise a pair of opposite pins 43, respectively screwed for adjustment in a longitudinal direction thereof into the plate 44 of the support means 1 and into a bracket 45 extending laterally from the cover member 14. A pair of buttons 46 having each a central stem 47 slidably mounted in bores formed in the opposite ends of the screw pins 43 engage with spherical surfaces opposite surfaces of the arm 15. Helically wound compression springs 48 located about the pins 43 press the buttons 46 respectively against the opposite surfaces of the arm 15. These springs 48 will dampen the motion of the arm 15, while the clearance provided between the end faces of the pins 43 and the faces of the buttons 46 opposite thereto make oscillation of the member 15 possible. A cover 50 covering the whole device is fastened by means of screws to the support 1 to protect the device from dust.

During the operation of the copying machine the contour of a template, not shown in the drawing, is moved against the bottom end of the contact feeler 2 and causes thereby a tilting of the contact feeler 2 and the oscillation of the spindle member 3 connected thereto. Oscillation of the spindle member 3 will cause tilting of the first transverse member 5. The second transverse member resting with its bottom surface against the supporting portions 6 of the first transverse member 5 and guided by the guide means 9 and 12 for movement in a vertical direction will thereby shift in this direction during the tilting of the spindle. This movement of the member 7 in vertical direction is transmitted to the switch arm 15 through the supports 16 and 17. Therefore, the arm 15 will oscillate or pivot about the stationary needle pivot 18 which contacts the upper surface of the member 15.

As may be seen from Fig. 2, the arm 15 includes an extension 20 which extends through an opening 52 of a support 51 carried by the wall 44. The extension 20 of the arm 15 terminates at its left end in a vertically extending portion 21 of the switch arm, and this portion 21 includes a plurality of extensions which respectively threadedly carry the screws 54–57. The pair of screws 54 and 55 cooperate with a block 23 for adjusting the elevation of the latter with respect to the switch arm, and a pair of screws 56 and 57 cooperating with a block 22 for adjusting the elevation of this block with respect to the switch arm.

Figures 6, 6A:
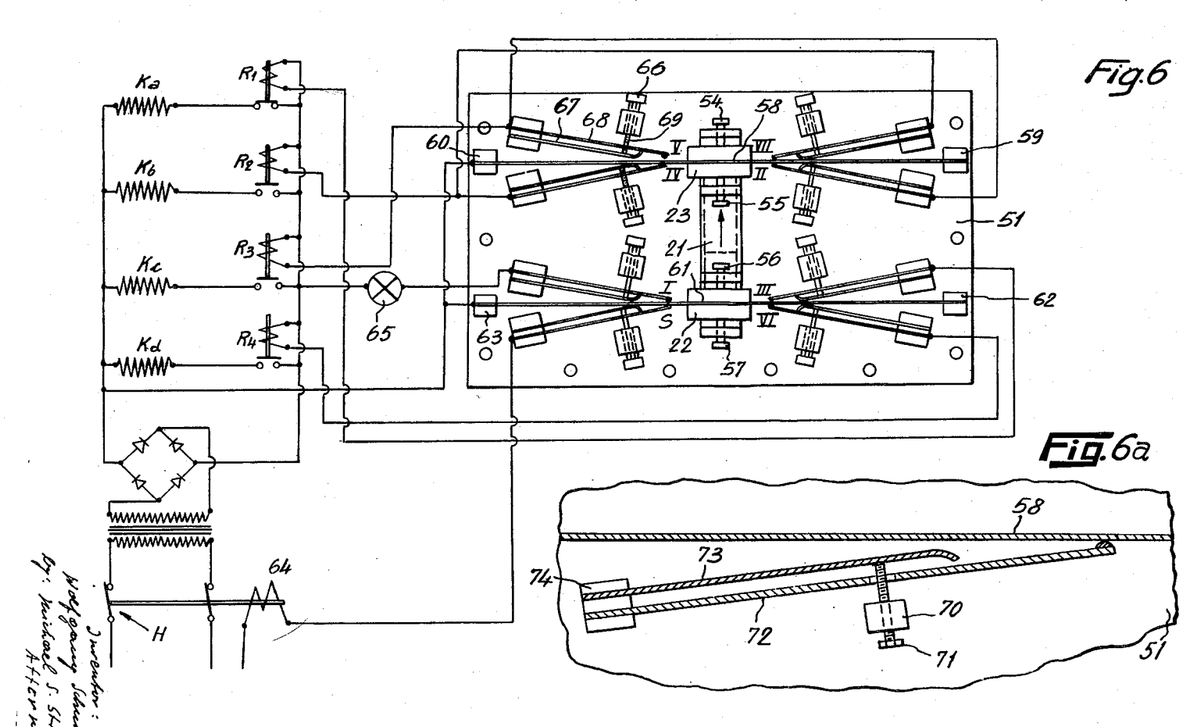
Fig. 6 is an end view of the switch means shown in Fig. 2, as seen from the left side of Fig. 2, Fig. 6 also showing the electrical structure which cooperates with the switch means.
Fig. 6a is a fragmentary sectional view on an enlarged scale illustrating a detail of the switch means of Fig. 6, Fig. 6a showing in detail the structure of the adjusatble contacts.

As may be seen from Fig. 6, the blocks 22 and 23 are formed with notches so that they are capable of receiving, respectively, the switch blades 61 and 58. The ends of the switch blade 58 are supported at pair of blocks 59 and 60 which are carried by the wall 51, and the ends of the blade 61 are carried by a pair of blocks 62 and 63 which also are carried by the wall 51. Of course, all of the electrically conductive parts are properly insulated so that the circuits will be open and closed as desired.

A plurality of contacts assemblies are carried by the wall 51 for cooperation with the switch blades 58 and 61. All of these contact assemblies are identical, and Fig. 6 shows the screw member 69 having a head end 66 and passing through an opening in a springy contact member 68 into engagement with a springy member 67 which controls the movement of the contact 68 by limiting the movement of this contact. This assembly is shown on an enlarged scale in Fig. 6a, where the switch blade 58 is shown cooperating with a springy contact member 72 which may be any one of the contact members shown in Fig. 6. The springy contact member 72 as well as the stop member 73 are carried by a block 74 fixed to the wall 51, and the block 70 is also fixed to the wall 51 and is formed with a threaded bore through which the screw member 71 threadedly extends, the end of this screw member bearing against the stop member 73 which is stronger than the springy contact member 72. With the parts as shown in Fig. 6a, it is evident that during upward movement of the switch blade 58 the springy contact member 72 will remain in engagement with this member 58 until the springy contact member 72 engages the springy stop member 73, and then the continued upward movement of the blade 58 will cause the latter to move away from the member 72 so as to open whichever circuit has been closed by cooperation of members 58 and 72. In this way all of the contact assemblies shown in Fig. 6 may be adjusted. Thus, those contact assemblies which are located beneath the switch blades 58 and 61 may be set so that the springy contact members follow the upward movement of the switch blades to the desired extent whereupon the springy contact members engage the springy stop members whose positions are adjusted by the screws, and the contact assemblies which are located over the switch blades 58 and 61 may be set so that the springy members are engaged by the switch blades at a predetermined point during the upward movement thereof and thereafter remain in engagement with these switch blades during the continued upward movement thereof. It is emphasized that these adjustments are very fine and the movement of the switch blades is extremely small in order to cause the several contact members to be engaged and disengaged in the sequence pointed out below. The deviations of the switch arms 15, 20, 21 which will produce the desired changes in the circuit are on the order of $1/100$ mm.

As may be seen from Fig. 6, there are eight springy contact members cooperating with the pair of switch blades 58 and 61, and these contact members include, as shown at the lower left portion of support 51 in Fig. 6, a safety contact S and a lamp contact L. The cooperation of blades 61 with contact L causes a lamp 65 to be illuminated as soon as and while the feeler is in contact with a template, and the safety contact S remains closed at all times except when the feeler is deflected beyond a certain limit whereupon the switch blade 61 moves out of contact with the springy contact member S so as to open the entire circuit. A main switch H shown at the lower left of Fig. 6 is provided for opening and closing the entire circuit, and the current for the entire circuit is derived from a coil 64 connected with the springy contact member S in the manner shown in Fig. 6. The electrical circuit shown in Fig. 6 further includes a plurality of electrical actuating means each of which includes a coil and a relay. Thus, the coils $K_a$–$K_d$ respectively cooperate with the relays $R_1$–$R_4$. These relays $R_1$–$R_4$ are normally closed, which is to say that they are closed when they are not energized. The manner in which these sets of electrical actuating means cooperate with the machine tool and are energized will be apparent from the description which follows.

Figure 7:
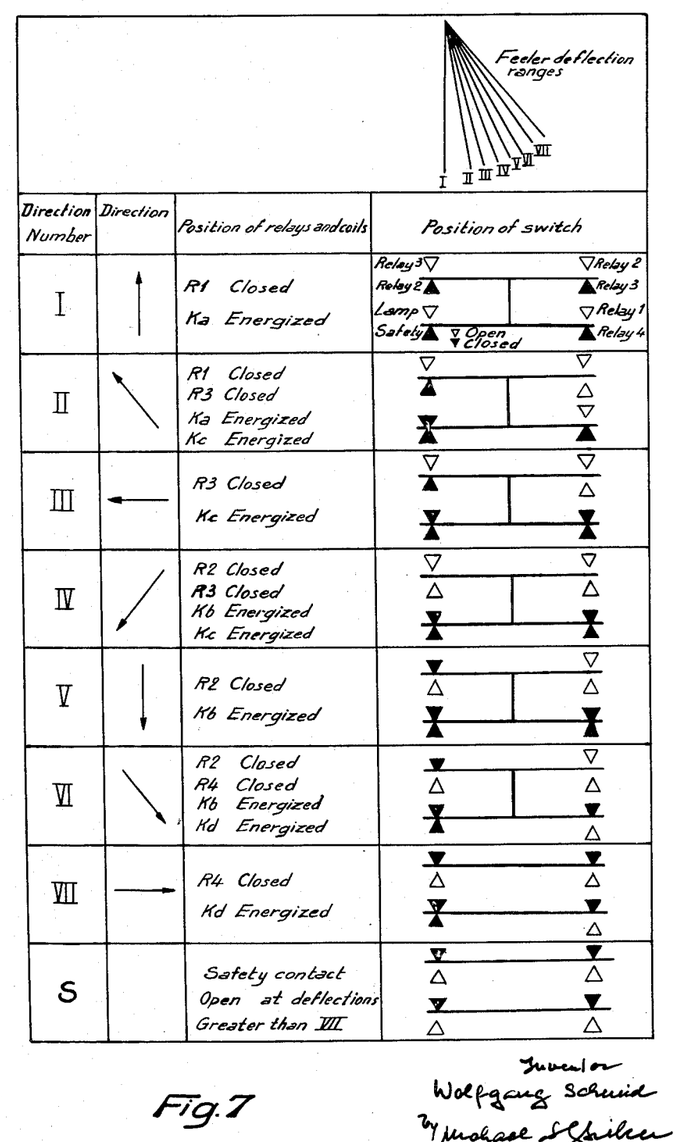
Fig. 7 is a diagrammatic illustration listing the various positions of the switch means as well as the movements produced by these positions and the parts energized thereby.
Figures 7A, 7B, 8:
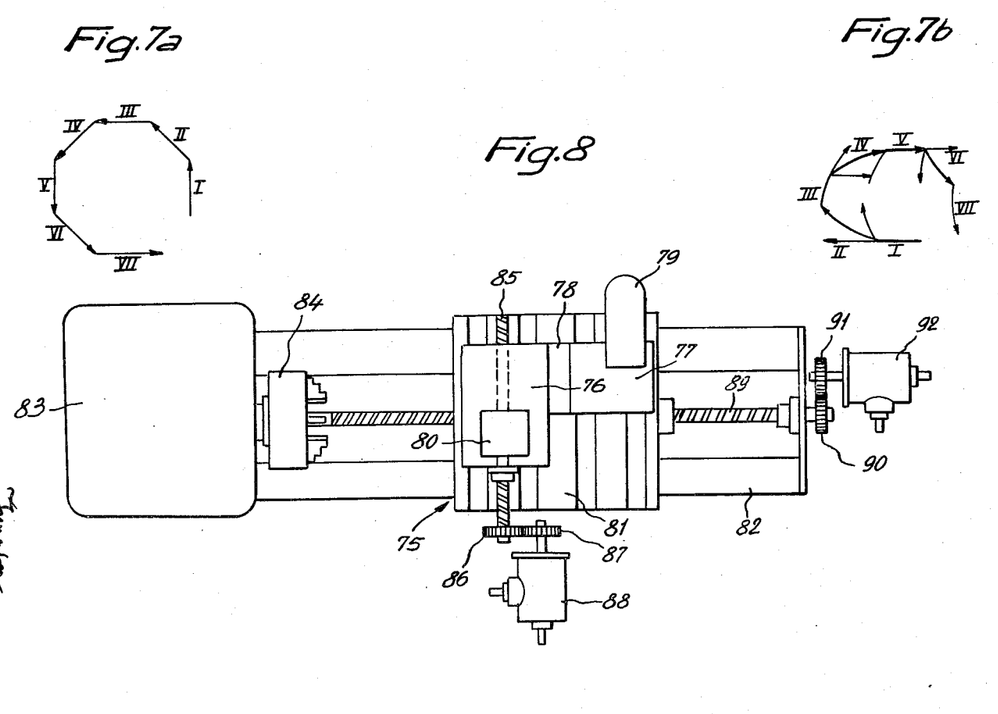
Fig. 7a shows the various movements which can be produced with the structure of the invention.
Fig. 7b shows other movements which can be provided.
Fig. 8 diagrammatically illustrates a machine tool controlled by the structure of the invention.

Fig. 8 diagrammatically illustrates a lathe which may form part of a machine tool of the present invention. This lathe includes a carriage means 75 made up of a pair of carriage members 76 and 77 interconnected with each other by a bridging member 78. The carriage 76–78 is guided for forward and rearward movement on a second carriage 81 of the carriage means 75, and this carriage 81 is guided for movement to the right and left, as viewed in Fig. 8, by the guideways 82 of the bed of the lathe. The carriage 77 carries a feeler assembly 79 having the above-described construction, and the carriage 76 carries any suitable cutting tool assembly 80. Fig. 8 also diagrammatically shows the drive 83 of the lathe as well as the chuck 84 which carries the work.

A screw member 85 which is restrained against axial movement with respect to the carriage 81 in any suitable way is supported by the carriage 81 and threadedly cooperates with the carriage 76–78 for moving the latter forwardly or rearwardly along the carriage 81 depending upon the direction of rotation of the screw 85. In a similar manner a screw 89 which is incapable of axial displacement threadedly cooperates with the carriage 81 for advancing the latter to the right or left. A reversible electric motor means comprising a reversible clutch 88 and an unillustrated motor drives a gear 87 which meshes with a gear 86 which is fixed with the screw 85, and a second motor means including a motor and the clutch 92, which is also reversible, cooperates with a gear 91 to rotate the latter, this gear 91 meshing with a gear 90 fixed to the screw 89. Thus depending upon the setting of the clutch 88 the carriage 76–78 together with the feeler assembly 79 and the cutting tool assembly 80 will be advanced forwardly or rearwardly, and depending upon the setting of the clutch 92 the carriage 81 with all of the structure carried thereby will be advanced to the right or left. Furthermore, by simultaneously operating the clutches 88 and 92 it is possible to advance the carriage means 75 simultaneously in two directions which cooperate to provide for the feeler assembly 79 and cutting tool assembly 80 diagonal directions of movement.

Figure 9:
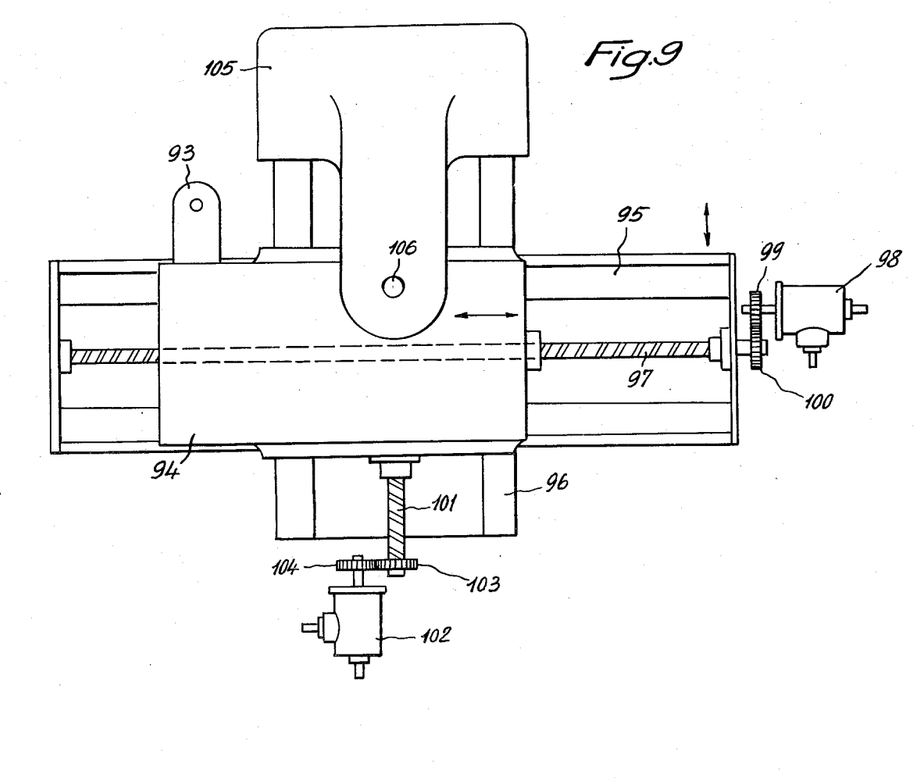
Fig. 9 is a diagrammatic illustration of another form of a machine tool which can be operated with the control structure of the present invention.

The structure of the invention may also be incorporated into a milling machine, as shown diagrammatically in Fig. 9. As may be seen from Fig. 9, the carriage means of the milling machine diagrammatically illustrated therein includes a carriage 94 which is adapted to carry the work and which also carries the feeler assembly 93 having the above-described construction and adapted to cooperate with an unillustrated template, the feeler assembly 79 of Fig. 8 also cooperating with an illustrated template. The carriage 94 is guided for movement to the right and to the left, as viewed in Fig. 9, on a carriage 95 which is supported on the guide ways 96 for movement forwardly and rearwardly. A screw member 97 which is prevented from shifting axially threadedly cooperates with the carriage 94 for moving the same to the right and left, and a reversible clutch 98 driven by an unillustrated motor rotates the screw 97 in one direction or the other through the gears 99, 100. A screw 101 which is also fixed in any suitable way against axial movement threadedly cooperates with the carriage 95 for advancing the latter forwardly and rearwardly depending upon the direction of rotation of the screw 101, and a reversible clutch 102 driven by an unillustrated motor cooperates through the gears 103, 104 with the screw 101 for rotating the latter. The milling machines includes a drive 105 which drives the tool 106 so that the latter rotates about its axis while the work is moved with respect to the tool in a known way. Thus, when the clutch 98 is actuated the carriage 94 will be shifted to the right or left, while when the clutch 102 is actuated the entire carriage means 94, 95 will be shifted forwardly and rearwardly, and of course by simultaneous operation of the clutches 98 and 102 movement of the work and feeler assembly in diagonal directions can be achieved.

Thus, the above-described motors together with the gearing and screws cooperating therewith as shown in Figs. 8 and 9 provide a moving means for moving the carriage means in a given direction depending upon the setting of the clutches and whether one or both clutches are set simultaneously.

The coils $K_a$ and $K_b$ of Fig. 6 are electrically connected with the clutch 88 of Fig. 8 so that when the coil $K_a$ is energized the clutch 88 will turn the screw 85 in a direction which advances the carriage 76—78 forwardly, while when the coil $K_b$ is energized the screw 85 will turn in an opposite direction to provide a rearward movement of the carriage 76—78. The coils $K_c$ and $K_d$ are electrically connected with the clutch 92 of Fig. 8 in such a way that when the coil $K_c$ is energized the screw 89 will turn to advance the carriage means 75 to the left, as viewed in Fig. 8, while when the coil $K_d$ is energized the carriage means 75 will advance to the right, as viewed in Fig. 8. When the structure of Fig. 6 is used with a milling machine as shown in Fig. 9, the coils $K_a$ and $K_b$ are electrically connected with the clutch 102 in such a way that when the coil $K_a$ is energized the screw 101 will turn in a direction which advances the carriage means 94, 95 forwardly, and when the coil $K_b$ is energized the carriage means 94, 95 will be moved rearwardly. The coils $K_c$ and $K_d$ of Fig. 6 cooperate with the clutch 98 of Fig. 9 in such a way that when the coil $K_c$ is energized the motor 98 will cause the screw 97 to turn in a direction which moves the carriage 94 to the left, as viewed in Fig. 9, and when the coil $K_d$ is energized the screw 97 will turn in an opposite direction to move the carriage 94 to the right, as viewed in Fig. 9.

The feeler means of the invention has several degrees of deflection I–VII indicated in Fig. 7 as well as further degree of deflection S which causes the entire circuit to open after the feeler has been deflected beyond position 7. These various degrees of deflection of the feeler means produce various directions of movement I–VII of the carriage means of the machine tool, these directions of movement being shown in the second column of Fig. 7 beside the several direction numbers. Also, these directions of movement are indicated in Fig. 7a. The third column of Fig. 7 indicates which relays and coils are energized by depending upon the position of the switch means, and the several positions of the switch means are indicated diagrammatically in the last column of Fig. 7.

When the switch means is at rest and the switch H is closed, only the relay $R_1$ will be closed, since the other relays are all energized, and as a result only the coil $K_a$ will be energized, the switch means having the first position indicated in Fig. 7 from which it is evident that the contact which controls the relay $R_1$ is out of engagement with the switch blade 61 so that the coil $K_a$ is energized, while the remaining relays are all energized, so that at this time the coils $K_b$ to $K_d$ are all de-energized. As a result, with the switch means in its rest position and the switch H closed, the carriage means of the machine tool will be advanced forwardly so as to cause the feeler to move into engagement with the template, and of course whenever the feeler is out of engagement with the template the carriage means will be automatically advanced forwardly.

As soon as the feeler engages the template, the switch L will be closed so as to illuminate the lamp 65, and the operator knows whether the feeler is in engagement with the template. Depending upon the configuration of the template, the feeler will be deflected at various times to increasing or decreasing degrees. As long as the feeler is deflected only through an initial range of movement away from its rest position, the switch arm of the switch means will also be moved through the above-described structure through an initial range of movement, and at this time only the relay $R_1$ will remain unenergized so that only the coil $K_a$ will be energized. If the cooperation of the feeler with the template produces a deflection of the feeler beyond the first range of deflection to a second range of deflection in the vicinity of deflection II indicated in Fig. 7, then the switch means will not only maintain the relay $R_1$ de-energized, but in addition the relay $R_3$ will become de-energized so as to energize the coil $K_c$, and at this range of deflection of the feeler of the coils $K_a$ and $K_c$ are both energized simultaneously so as to cause both clutches of Fig. 8 or both motors of Fig. 9 to cooperate simultaneously, and this produces a combination of movements of the carriage means, namely a forward movement and a leftward movement, which results in the direction II indicated in Figs. 7 and 7a.

As may be seen from Fig. 6, in the rest position of the switch means the blade 61 is out of contact with the springy contact member shown at III, so that in this way the relay $R_1$ is maintained unenergized, and after the switch means has moved upwardly, as viewed in Fig. 6, through the first range of movement into the second range of movement mentioned above, the switch blade 61 still has not engaged the contact III while at the same time the blade 58 has moved out of engagement with the contact shown at II, so as to deenergize the relay $R_3$ at this second range of deflection of the feeler.

Continued deflection of the feeler into a third range in the vicinity of position III the feeler indicated in Fig. 7, will cause the blade 61 to move into engagement with the springy contact shown at III in Fig. 6, and as a result the relay $R_1$ will become energized so as to deenergize the coil $K_a$. Thus, in this third range of deflection of the feeler means only the coil $K_c$ remains energized and thus the carriage means of Fig. 8 or Fig. 9 will move only to the left, and the direction of movement indicated at III in Fig. 7a will result.

Upon further deflection of the switch means to a fourth range of movement brought about by further deflection of the feeler means to the range in the vicinity of IV indicated in Fig. 7 will still maintain the relay $R_3$ unenergized so that the coil $K_c$ remains energized, but in addition this continued movement of the switch means into the fourth range will cause the switch blade 58 to move out of engagement with the springy contact shown at IV in Fig. 6, and as a result the relay $R_2$ will become unenergized so as to energize the coil $K_b$, and as a result at this time the clutch 88 of Fig. 8 will cause the carriage 76–78 to move rearwardly, or the clutch 102 of Fig. 9 will cause the carriage means to move rearwardly, and thus at this fourth range of movement of the switch means and deflection of the feeler both of the motors of the machine operate simultaneously to produce the movement IV indicated in Fig. 7a.

Continued deflection of the feeler into a fifth range in the vicinity indicated at V in Fig. 7 will cause the switch means to move into a fifth range of movement, and at this time the switch blade 58 will be in contact with the contact member shown at V in Fig. 6, and as a result the relay $R_3$ will again become energized so as to de-energize the coil $K_c$, and thus in this position only the coil $K_b$ will be energized and movement in the direction V indicated in Figs. 7 and 7a will be produced.

It will be noted that during all of the above operations the springy contact at the lower right of Fig. 6 has remained in engagement with the blade 61 so that the relay $R_4$ has been energized during all of this time and as a result the coil $K_d$ has been unenergized during all of this time. Now, upon further deflection of the feeler to the vicinity of the sixth degree indicated at VI in Fig. 7, the switch means will be moved through a sixth range of movement at which the blade 61 is out of contact with the contact member indicated at VI in Fig. 6, and as a result the relay $R_4$ is now unenergized so that the coil $K_d$ becomes energized at this time. Thus, during the sixth range of movement of the switch means resulting from further deflection of the feeler the coils $K_b$ and $K_d$ are simultaneously energized so that both motors of the machine tool operate simultaneously to produce the movement indicated at VI in Fig. 7.

Finally, during still further deflection of the feeler means to the region indicated at VII in Fig. 7, the switch means will be deflected into a seventh range of movement which will maintain the relay $R_4$ unenergized but in which the switch blade 23 moves into engagement with the contact shown at VII at the upper right of Fig. 6, and as a result the relay $R_2$ becomes energized so as to de-energize the coil $K_b$, and thus during this seventh range of deflection of the feeler and movement of the switch means only the coil $K_d$ remains energized so that only rightward movement of the carriage of the machine tool is provided, as indicated in Fig. 7 as well as at VII in Fig. 7a.

Upon still further deflection of the feeler means, the switch means will be deflected to an extent which will cause the blade 61 to move out of engagement with contact S, and as a result the entire circuit will become open, the feeler means having been deflected too far, so that the contact operates as a safety device to prevent further operations when the feeler is deflected beyond range VII.

In the above described manner the structure of the invention automatically operates a machine tool so that the feeler automatically engages the template to produce automatic machining according to the configuration of the template, and very slight deflections produce changes in the direction of movement of the carriage means of the machine tool in all above-described directions.

Where the carriage means of the machine tool includes a rotary table which is to say one carriage which can turn about a given axis and which is supported by a second carriage for longitudinal movement, then movements as indicated in Fig. 7b will be provided with the structure of the invention.

Figures 10, 10A, 11:
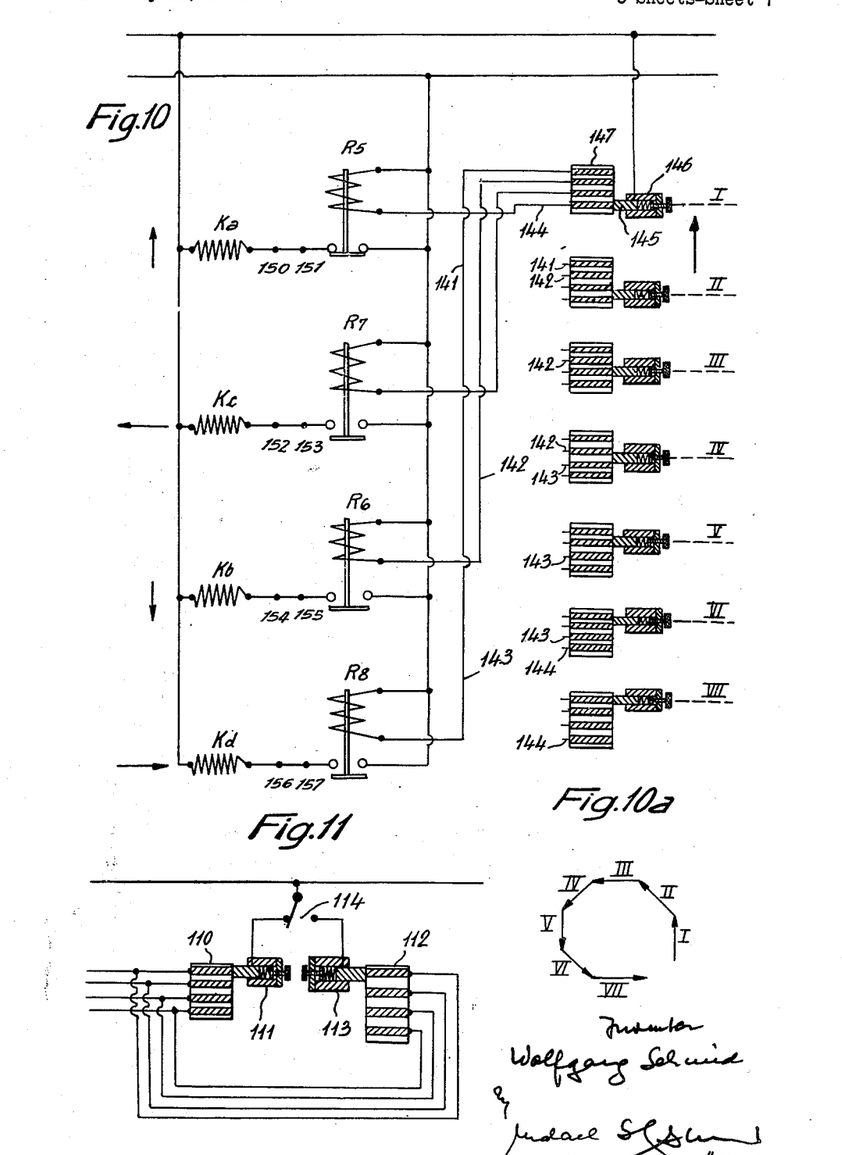
Fig. 10 is a wiring diagram of another embodiment of a control structure according to the present invention.
Fig. 10a shows the movements produced by the structure of Fig. 10.
Fig. 11 shows a further embodiment of a control structure according to the present invention.

Fig. 10 shows a different embodiment of a switch means according to the present invention. In Fig. 10 the coils $K_a$–$K_d$ cooperate in the manner described above with the motors of the machine tool. However, these coils respectively connect electrically with relays $R_5$–$R_8$ which are different from the relays $R_1$–$R_4$ in that relays $R_5$–$R_8$ are open when they are not energized and become closed upon becoming energized, so that these relays $R_5$–$R_8$ are normally open relays and must be energized to become closed and in order to energize the cooperating coils. The switch arm of the switch means of Fig. 10 is identical with the switch arm of Figs. 1 and 2, except that this switch arm carries a brush assembly 146 which includes the brush member 145 which slides along a series of contacts 147 which are maintained stationary. This series of contacts 147 are connected electrically with the relays in the manner shown in Fig. 10. Thus, the uppermost contact is connected through the lead 141 with the relay $R_8$, while the next contact is connected through the lead 142 with the relay $R_6$, and the next lower contact is connected through the lead 143 with a relay $R_7$, and of course the lowest contact is connected through the lead 144 with the relay $R_5$. When the switch means is in its rest position the brush 145 will engage only the lowermost of the series of contacts 147, so that in this position only the relay $R_5$ will be energized, the entire circuit being connected to the lines in the manner shown in Fig. 10. Thus, in this position only a forward movement of the carriage will be provided, as indicated at I in Fig. 10a. During continued deflection of the feeler and movement of the switch means in the manner described above, the brush 145 will remain in engagement with the lowermost of the series of contacts while simultaneously engaging the next higher contact, and this is the position II indicated in Fig. 10, at this time the relays $R_5$ and $R_7$ becoming simultaneously energized so that the coils $K_a$ and $K_c$ are simultaneously energized to produce movement II indicated in Fig. 10a. Further deflection will cause the brush 145 to engage only the second highest contact which is connected by the lead 143 with the relay $R_7$, so that only the coil $K_c$ is energized, and this way only movement III indicated in Fig. 10a will be provided. In this way during continued deflection of the feeler and further movement of the switch means through its several ranges of movement referred to above the various movements indicated in Figs. 10 and 10a will be provided, so that the structure of Fig. 10 is capable of producing the same results as the structure of Fig. 6.

As may be seen from Fig. 11, the switch arm of the switch means may carry a pair of brushes 111 and 113 identical with the brush assembly 146, and the brush 111 cooperates with a series of contacts 110 connected electrically with the several relays of Fig. 10 in the same way as the series of contacts 147, while the brush 113 cooperates with a series of contacts 112 connected electrically with the relays of Fig. 10 in the same way as the series of contacts 147, as is evident from Fig. 11. It will be noted that while in all cases the series of contacts are spaced from each other by a distance less than the thickness of the brush which cooperates therewith so that the brush is capable of simultaneously contacting a pair of adjacent contacts, nevertheless the series of contacts 112 are spaced from each other by a distance greater than the series of contacts 110. Thus, by energizing the assembly 110, 111 fine adjustments of the direction of movement may be carried out, while by energizing the assembly 112, 113 coarse adjustments may be carried out. For example, when the feeler cooperates with a portion of the template which does not have any substantial change in direction, the series of contacts 112 may be energized to cooperate with the brush 113, while when there are rapid changes in direction of the contour of the template, the assembly 110, 111 may be energized. For this purpose a switch 114 is provided as shown in Fig. 11 so as to enable either one of the brushes and contact assemblies indicated to be energized depending upon whether coarse or fine movements are required. With the arrangement shown in Fig. 11 adjustments of the contacts are unnecessary and the spaces between the series of contacts may remain the same. It is also possible to provide if desired, a third set of contacts spaced differently from each other than the two sets shown in Fig. 11 and cooperating with a third brush, and this third assembly may be optionally energized at the will of the operator.

Figure 12:
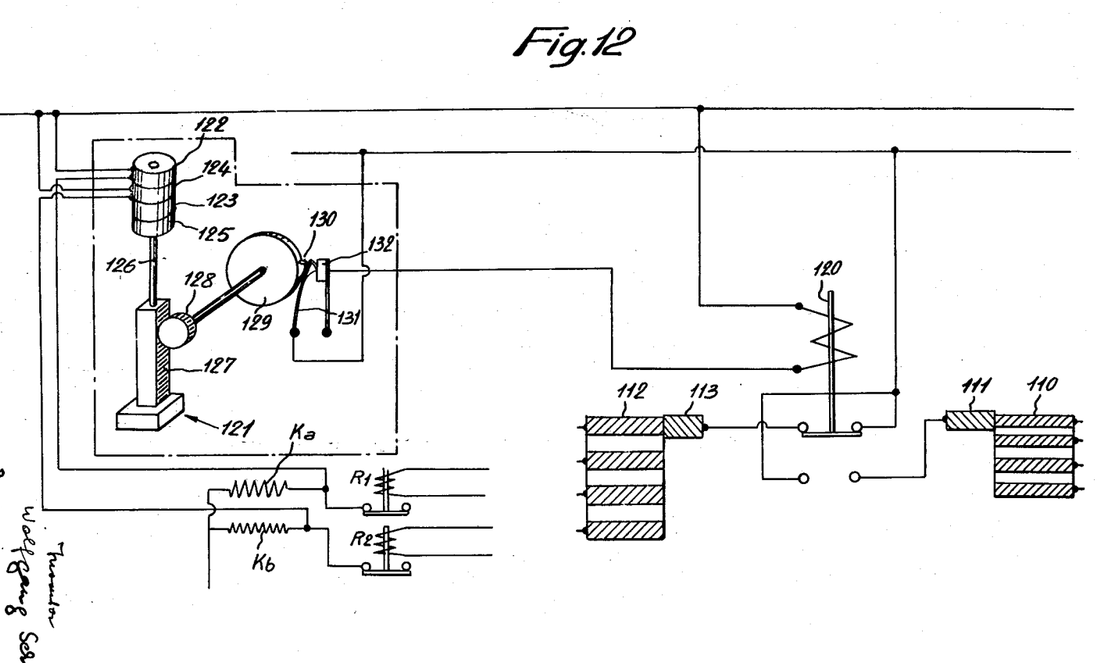
Fig. 12 illustrates yet another embodiment of automatic control structure according to the present invention.
Figure 13:
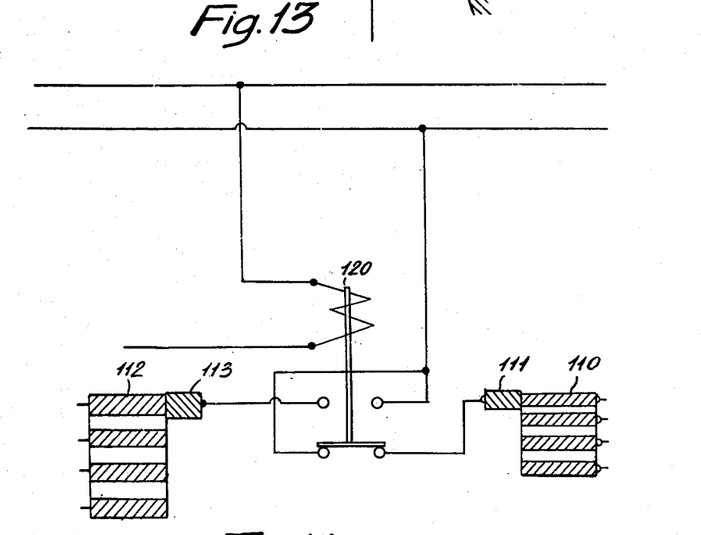
Fig. 13 is a partial illustration of the structure of Fig. 12 in a position different from that shown in Fig. 12.

The switching over from fine to coarse adjustments may be carried out automatically with the structure illustrated in Fig. 12, Fig. 12 showing the position which the parts take when set for coarse adjustment, and Fig. 13 showing the position which the parts take for fine adjustment. Thus, when the relay 120 shown in Figs. 12 and 13 is unenergized, it will have the position shown in Fig. 13, and when this relay is energized it will have the position shown in Fig. 12.

The relay 120 is automatically actuated by a time-delay switch arrangement diagrammatically shown in Fig. 12. This time delay switch assembly 121 includes a plurality of coils 122–125 which are coaxial with each other and which are electrically connected with the several coils $K_a$–$K_d$, respectively, so that whenever the latter coils are energized then the coils 122–125 electrically connected therewith are also energized. Thus, when $K_a$ is energized then the coil 122 will also be energized, and so on. The coaxial coils 122–125 are of annular configuration, and an armature 126 is movable in these coils so that a solenoid arrangement is provided, and the armature 126 has a rack portion 127 fixed thereto for movement therewith and cooperating with a pinion 128 for turning the latter when the armature 126 moves axially. The pinion 128 is fixed to an annular disc 129 which carries a cam 130 acting on a springy contact member 131 which cooperates with a stationary contact member 132 connected with the relay 120 in the manner shown in Fig. 12. Thus, when switch members 131 and 132 are in contact with each other, the relay 120 will be energized and as a result the machine will be set for coarse adjustments. When the switch 131, 132 is open, the relay 120 will be unenergized, and the parts will have the position indicated in Fig. 13. It is apparent from Fig. 12 that the switch 131, 132 will be closed only when the disc 129 has the angular position shown in Fig. 12, and the disc 129 has this angular position either when the solenoid is unenergized so that the armature 126, 127 has the position shown in Fig. 12, or when the armature has been energized for so long that there has been sufficient time for the armature 126, 127 to have moved all the way up so as to turn the disc 129 through 360° in order to again close the switch 131, 132. In any position except that shown in Fig. 12, the switch 131, 132 is open.

Figure 14:
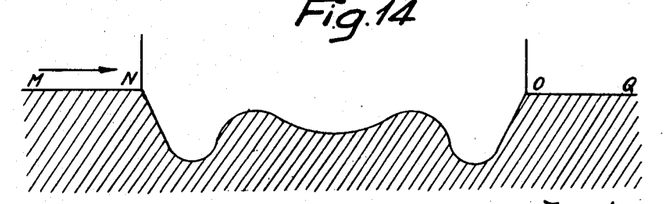
Fig. 14 illustrates a portion of a template with which the feeler cooperates, Fig. 14 showing the operation in connection with Figs. 12 and 13.

As a result, referring to Fig. 14, along the portion MN of a template, where there is substantially no change in the direction of movement or deflection of the feeler, the energizing of the coils $K_a$–$K_d$ which produces the movement in the direction MN will maintain the particular coil of the series of coils 122–125 which corresponds to that one of the coils $K_a$–$K_d$ which is energized sufficiently long to have moved the armature 126, 127 all the way up, and thus the switch 131, 132 is now closed and the relay 120 is energized. On the other hand, when the feeler engages the portion NO of the template indicated in Fig. 14 there are rapid changes in direction, and as a result the coils 122–125 are becoming rapidly energized and de-energized so that the disc 129 is in a position different from that shown in Fig. 12, and the relay 120 is unenergized so that the parts have the position shown in Fig. 13 and are set for fine adjustment. Upon reaching of the portion OQ indicated in Fig. 14, the feeler will again remain with substantially no change in deflection for a substantial period of time, and thus one of the coils 122–125 will remain energized sufficiently long to have moved the armature 126, 127 all the way up to its uppermost position and the disc 129 will again have the angular position indicated in Fig. 12. In this way a time delay is provided through the movement of the armature 126, 127 so as to prevent energizing of the relay 120 until the feeler has remained in a given position for a given period of time.

It should be noted that the relay 120 will be energized only when the movements are in the directions I, III, V or VII, which is to say when the carriage means move either forwardly or rearwardly or to the right or left. When diagonal movements are provided as a result of combinations of the forward movement with one of the lateral movements or the rearward movement with one of the lateral movements, then the relay 120 will be unenergized and the apparatus will be set for fine adjustment. This results from the operation which is shown on a tremendously enlarged scale in Fig. 12a.

Figure 12A:
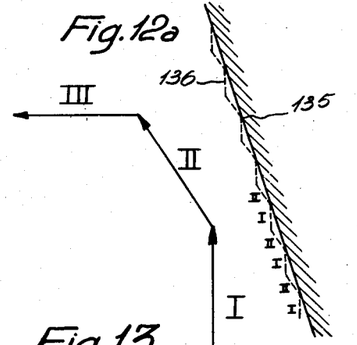
Fig. 12a shows on a greatly enlarged scale the movement of the feeler with respect to the template during a part of the operation of the structure of the invention.

Referring to Fig. 12a, it will be seen that while the feeler cooperates with a portion 135 of a template which provides movement intermediary between I and II, the feeler actually moves in the manner indicated by the line 136 in Fig. 12a, which is to say that the feeler carries out very minor movements I and II so as to follow the edge 135 of the template. These slight zig-zag movements are so small that they are not noticeable by the naked eye and do not result in any movement of the carriage means except a movement in the direction 135. However, the feeler is nevertheless very rapidly changing its deflection whenever it engages an edge of the template which extends in a diagonal direction, as opposed to the directions I, III, V and VII, and thus whenever the feeler moves in one of these diagonal directions II, IV or VI the relay 120 is unenergized and the device is automatically set for fine operation.

The above described electrical assembly may be arranged in any suitable box and may have interchangeable plugs for easily providing changes in the wiring. For example, when it is desired to change over from external copy work to internal copy work, the terminal 150 of the coil $K_a$ instead of being connected to the terminal 151 may be connected with the terminal 155 indicated in Fig. 10, and the terminal 154 of the coil $K_b$ may be connected with the terminal 151, so that in this way when the brush 146 engages the lowermost of the series of the contacts 147 the coil $K_b$ will be energized, and then internal copy work may be carried out. The possible variations in the interconnection of the plugs 150–157 indicated in Fig. 10 are numerous in order to provide various different types of operations. For example, when a part having important lateral contours is to be machined in a lathe, then the right and left movements are the more important, and at this time it is advisable to interconnect the terminal 150 of Fig. 10 with the terminal 153, while the terminal 151 is interconnected with the terminal 152. The terminal 154 is then connected with the terminal 157, and the terminal 155 is connected with the terminal 156. Changes of this type can be easily carried out with suitable plug reversal arrangements which are well known in the art.

It will be understood that each of the elements described above, or two or more together, may also find a useful application in other types of machine tools differing from the types described above.

While the invention has been illustrated and described as embodied in automatic copying machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, carriage means movable at any given instant in one of seven different directions; moving means cooperating with said carriage means moving the same at any given instant in one of said seven different directions; at least four electrical actuating means cooperating with said moving means for actuating the same to move said carriage means at any given instant in one of said seven different directions depending upon which of said actuating means is energized at said instant; switch means comprising a plurality of contacts and movable contact means movable away from and back toward a rest position and cooperating to a plurality of predetermined positions in which said movable contact means cooperates with said actuating means for sequentially energizing all of electrical actuating means but not more than two at one time during movement of said switch means away from said rest position thereof; and feeler means capable of being deflected from a rest position by cooperation with a template and cooperating with said movable contact means, means for moving the latter away from said rest position thereof to said predetermined positions, respectively, depending on the degree of deflection of said feeler means so that the direction of movement of said carriage means is determined only by the degree of deflection of said feeler means.

2. In a machine tool, in combination, carriage means capable of carrying out a first pair of opposed movements and a second pair of opposed movements different from said first pair of opposed movements; moving means cooperating with said carriage means for moving the same at any given instant along any one of said movements or in a direction resulting from a combination of one of said first pair of movements with one of said second pair of movements; a plurality of at least four electrical actuating means corresponding respectively to said movements and cooperating with said moving means for actuating the same to move said carriage means at any given instant along one of said movements depending upon which one of said actuating means is energized or along a movement resulting from a combination of one of said first pair with one of said second pair of movements depending upon which two of said actuating means are energized; switch means movable away from and back toward a rest position and cooperating with said plurality of actuating means for energizing, during movement of said switch means away from said rest position thereof, a first one of said plurality of actuating means, then a second one of said plurality of actuating means while said first actuating means remains energized, for then de-energizing said first actuating means while said second actuating means remains energized, then energizing a third actuating means while said second actuating means remains energized, then maintaining said third actuating means energized while said second actuating means is de-energized, and so on until only the fourth of said actuating means remains energized; and feeler means capable of being deflected from a rest position by cooperation with a template and cooperating with said switch means for moving the latter away from said rest position thereof to an extent proportional to the degree of deflection of said feeler means, so that the direction of movement of said carriage means is determined only by the degree of deflection of said feeler means.

3. In a machine tool, in combination, carriage means capable of carrying out a plurality of different movements; moving means cooperating with said carriage means for moving the same at any given instant along one of said plurality of different movements; at least four actuating means cooperating singly and in pairs with said moving means for actuating the same to move said carriage means at any given instant along one of said movements depending upon which single ones of said actuating means or which pairs of said actuating means are energized at any given instant; switch means movable away from and back toward a rest position and cooperating with said actuating means for energizing the latter singly and in pairs according to a predetermined sequence during movement of said switch means away from said rest position thereof; said switch means de-energizing all of said actuating means to stop the movement of said carriage means when said switch means moves beyond a predetermined extent away from said rest position thereof; and feeler means capable of being deflected from a rest position by cooperation with a template and cooperating with said switch means for moving the latter away from said rest position thereof to an extent proportional to the degree of deflection of said feeler means so that the direction of movement of said carriage means is determined comprising a plurality of contacts and movable contact means by the degree of deflection of said feeler means, said feeler means when it has been deflected beyond a predetermined degree moving said switch means beyond said predetermined extent to de-energize all of said actuating means.

4. For use in a device for automatically controlling a machine tool, in combination, an elongated switch blade; means for connecting said switch blade to a source of electrical current; a switch arm carrying said blade insulated therefrom for moving the latter during movement of said switch arm; feeler means cooperating with said switch arm for moving the latter and said blade therewith during deflection of said feeler means by a template cooperating therewith; a plurality of relays; and a plurality of adjustable springy contacts in circuit with said relays and cooperating with said blade for opening and closing said relays during movement of said blade with said arm, some of said contacts moving with said blade while remaining in engagement therewith up to a predetermined point and others of said contacts being engaged by said blade after the latter has been moved to a predetermined extent, said contacts connected in circuit with said relays so that during movement of said blade in one direction said relays are closed one after the other and each relay opened only after the following relay is closed.

5. For use in a device for automatically controlling a machine tool, in combination, a first series of spaced contacts and a first brush cooperating therewith and a second series of spaced contacts spaced closer to each other than said first series of contacts and a second brush cooperating with said second series of contacts, whereby said first series of contacts and first brush may be used for carrying out coarse adjustments while said second series of contacts and second brush may be used for carrying out fine adjustments, the distance between any two adjacent contacts being less than the thickness of the brush cooperating therewith so that the latter during its movement from one to the next contact simultaneously engages a pair of adjacent contacts; an arm carrying said brushes for simultaneously moving the same along said series of contacts, respectively; feeler means cooperating with said arm for moving the same, so as to move said brushes along said contacts, according to the degree of deflection of said feeler means; and means cooperating with said brushes and contacts for energizing at any given time either said first series of contacts and first brush for carrying out coarse adjustments or said second series of contacts and second brush for carrying out fine adjustments.

6. For use in a device for automatically controlling a machine tool, in combination, a first series of spaced contacts and a first brush cooperating therewith and a second series of spaced contacts spaced closer to each other than said first series of contacts and a second brush cooperating with said second series of contacts, whereby said first series of contacts and first brush may be used for carrying out coarse adjustments while said second series of contacts and second brush may be used for carrying out fine adjustments, the distance between any two adjacent contacts being less than the thickness of the brush cooperating therewith so that the latter during its movement from one to the next contact simultaneously engages a pair of adjacent contacts; an arm carrying said brushes for simultaneously moving the same along said series of contacts, respectively; feeler means cooperating with said arm for moving the same, so as to move said brushes along said contacts, according to the degree of deflection of said feeler means; and automatic means for energizing said first series of contacts and first brush when said feeler means cooperates with a portion of a template whose direction does not change substantially and for energizing said second series of contacts and second brush when the portion of the template which cooperates with said feeler means provides rapid changes in direction.

7. For use in a device for automatically controlling a machine tool, in combination, a first series of spaced contacts and a first brush cooperating therewith and a second series of spaced contacts spaced closer to each other than said first series of contacts and a second brush cooperating with said second series of contacts, whereby said first series of contacts and first brush may be used for carrying out coarse adjustments while said second series of contacts and second brush may be used for carrying out fine adjustments, the distance between any two adjacent contacts being less than the thickness of the brush cooperating therewith so that the latter during its movement from one to the next contact simultaneously engages a pair of adjacent contacts; an arm carrying said brushes for simultaneously moving the same along said series of contacts, respectively; feeler means cooperating with said arm for moving the same, so as to move said brushes along said contacts, according to the degree of deflection of said feeler means; and time-delay relay means cooperating with said brushes and contacts for energizing said first series of contacts and first brush when said feeler means operates without a change in deflection for more than a given period of time and for energizing said second series of contacts and second brush when the deflection of said feeler means is changed within said period of time.

8. In a machine tool, in combination, carriage means movable in four different directions displaced by 90° from each other; moving means cooperating with said carriage means for moving the same in any one of said directions or in a diagonal direction resulting from a combination of two of said four directions; four electrical actuating means cooperating singly and in pairs with said moving means for actuating the same to move said carriage means in one of said four directions or in a diagonal direction; switch means movable away from and back toward a rest position and cooperating with said plurality of actuating means for energizing the latter singly and in pairs during movement of said switch means away from a rest position thereof, said switch means including a first series of contacts and a brush movable along the same and a second series of contacts spaced closer to each other than said first series of contacts and a second brush movable along said second series of contacts, so that when said first series of contacts are energized together with the brush cooperating therewith coarse adjstments of the direction of movement of the carriage will be carried out while when said second series of contacts and second brush are energized fine adjustments of the direction of movement of said carriage means will be carried out; feeler means capable of being deflected from a rest position by cooperation with a template and cooperating with said switch means for moving the latter away from said rest position thereof to an extent proportional to the degree of deflection of said feeler means so that the direction of movement of said carriage means is determined by the degree of deflection of said feeler means; and time delay means cooperating with said contacts and brushes for energizing said first series of contacts and brush cooperating therewith when said carriage moves in one of said four directions and for energizing said second series of contacts and said second brush when said carriage moves in a diagonal direction.

9. In a machine tool including carriage means movable at any given instant in one of seven different directions and moving means cooperating with said carriage means for moving the same at any given instant in one of said seven different directions, in combination, at least four electrical actuating means adapted to ccoperate with said moving means for actuating the same so as to move said carriage means of said machine tool at any given instant in one of said seven different directions depending upon which of said actuating means is energized at said instant; switch means comprising a plurality of contacts and movable contact means movable away from a rest position to a plurality of predetermined positions in which said movable contact means cooperates with said actuating means for sequentially energizing all of said actuating means but not more than two at one time during movement of said switch means away from said rest position thereof; and feeler means capable of being deflected from a rest position by cooperation with a template and cooperating with said movable contact means for moving the latter away from said rest position thereof to said predetermined positions, respectively, depending on the degree of deflection of said feeler means so that the direction of movement of said carriage means is determined only by the degree of deflection of said feeler means.

References Cited in the file of this patent
UNITED STATES PATENTS

| | | |
|---|---|---|
| 1,756,727 | Brower | Apr. 29, 1930 |
| 2,162,491 | Rosen | June 13, 1939 |
| 2,334,956 | Ridgway | Nov. 23, 1943 |
| 2,373,332 | O'Neill | Apr. 10, 1945 |
| 2,511,956 | Wetzel | June 20, 1950 |
| 2,723,598 | Mann | Nov. 15, 1955 |